(12) United States Patent
Weidlich

(10) Patent No.: US 6,468,033 B1
(45) Date of Patent: Oct. 22, 2002

(54) METHODS AND APPARATUS FOR MAINTAINING ALIGNMENT OF BORESCOPE PLUNGERS

(75) Inventor: Robert Frederick Weidlich, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/678,070

(22) Filed: Oct. 3, 2000

(51) Int. Cl.[7] ............................................... F01D 25/00
(52) U.S. Cl. .......................................... 415/118; 60/801
(58) Field of Search .................... 415/118, 201, 415/135, 136, 138; 60/39.33, 801; 356/241.1, 241.3–241.6

(56) References Cited

U.S. PATENT DOCUMENTS

| | | | |
|---|---|---|---|
| 3,362,160 A | * 1/1968 | Bourgeois | .................... 415/118 |
| 4,011,017 A | 3/1977 | Feuerstein et al. | |
| 4,139,822 A | 2/1979 | Urich et al. | |
| 4,300,774 A | 11/1981 | Hollis et al. | |
| 4,669,874 A | 6/1987 | Leiby et al. | |
| 4,815,276 A | * 3/1989 | Hansel et al. | ................ 415/118 |
| 5,185,996 A | * 2/1993 | Smith et al. | ................ 415/118 |
| 5,431,534 A | * 7/1995 | Charbonnel | ................. 415/118 |
| 5,867,976 A | 2/1999 | Ziegler, Jr. | |
| 5,115,636 A | * 5/1999 | Zeiser | ......................... 415/118 |

FOREIGN PATENT DOCUMENTS

GB  2103295 A  *  2/1983  ................. 415/118

* cited by examiner

Primary Examiner—Christopher Verdier
(74) Attorney, Agent, or Firm—Nathan D. Herkamp; Armstrong Teasdale LLP

(57) ABSTRACT

A gas turbine engine borescope plug including a retainer that facilitates extending the useful life of the borescope plug is described. The borescope plug seals a pair of opposing inspection port openings in at least two respective spaced-apart walls and maintains sealing contact despite differential thermal growth between the two walls. The borescope plug includes the retainer, a plunger, and a biasing mechanism. The plunger extends through the biasing mechanism and the retainer. The retainer contacts the cylindrical biasing mechanism and maintains its position relative to the plunger to prevent contact between the plunger and the biasing mechanism.

19 Claims, 2 Drawing Sheets

METHODS AND APPARATUS FOR MAINTAINING ALIGNMENT OF BORESCOPE PLUNGERS

BACKGROUND OF THE INVENTION

This invention relates generally to gas turbine engine inspection port openings and, more particularly, to borescope plugs used to seal gas turbine engine inspection port openings.

Gas turbine engines often include spaced apart walls or casings that include opposing openings sealed with removable seals. The seals are removable to permit inspection equipment to access engine components housed within the casings. The spaced apart walls include an inner wall and an outer wall. The inner wall is subjected to greater temperatures than the opposed outer wall during gas turbine engine operation which results in differential thermal expansion. The spaced apart openings therefore may become misaligned during engine operation causing leakage through at least one of the openings. Hot gases that escape through the inspection port openings may cause damage to other engine components.

To reduce seal leakage, and more specifically, to accommodate the differential thermal growth described above, known borescope plugs include a spring and a plunger. A first end of the plunger is housed within a housing surrounding a first inspection port opening, and includes a ball and swivel joint that permits the plunger to swivel while maintaining sealing contact with the first inspection port opening. A first end of the spring is tapered to maintain contact with the swivel joint and a second end of the spring maintains the plunger in sealing contact against a second inspection port opening.

As the engine operates, the borescope plug moves in proportion to differential thermal expansion of the walls. During engine operation temperature changes, as temperatures increase, the borescope plug plunger second end may shift abruptly in response to thermal expansion of the second wall causing the plunger first end to bind. As the spring second end continues to move, the spring first end may become unseated from the ball joint and become wedged against the plunger. Over time, continued contact between the spring and the plunger may cause damage to the plunger and shorten the useful life of the borescope plug.

BRIEF SUMMARY OF THE INVENTION

In an exemplary embodiment, a borescope plug for a gas turbine engine includes a retainer that facilitates extending the useful life of the borescope plug. The borescope plug seals a pair of opposing inspection port openings in at least two respective spaced-apart walls despite differential thermal growth between the two walls. The borescope plug includes the retainer, a plunger, and a biasing mechanism. The plunger extends through the biasing mechanism and the retainer.

In use, the biasing mechanism biases the plunger to maintain sealing contact against one of the inspection port openings despite differential thermal growth between the spaced-apart walls. The retainer contacts the substantially cylindrical biasing mechanism and maintains a position of the biasing mechanism relative to the plunger. Accordingly, the retainer prevents the biasing mechanism from contacting the plunger. As a result, the borescope plug retainer facilitates extending the useful life of the plunger and the borescope plug in a cost effective and reliable manner.

DETAILED DESCRIPTION OF THE INVENTION

Figure 1:
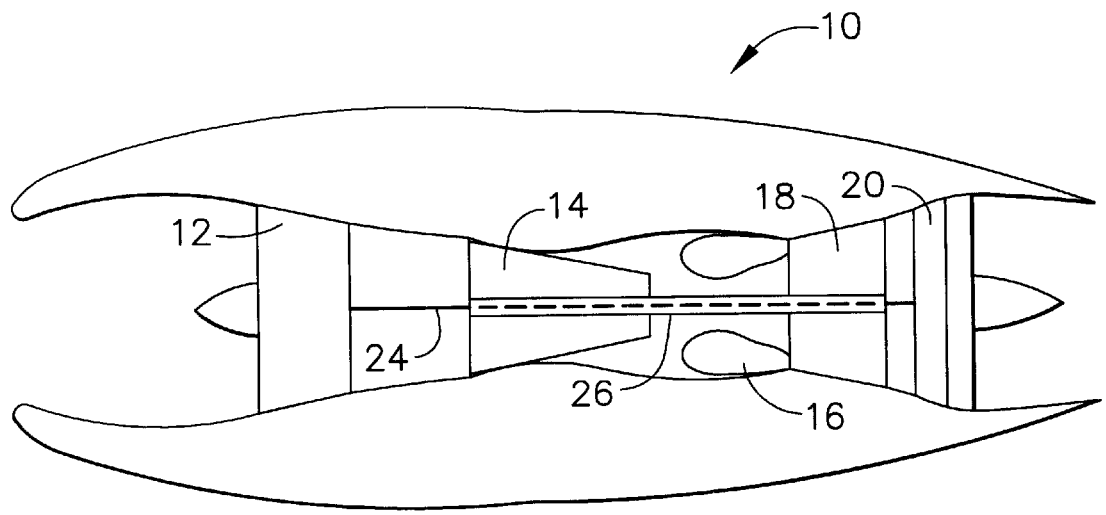
FIG. 1 is a schematic illustration of a gas turbine engine including a plurality of borescope inspection port openings.

FIG. 1 is a schematic illustration of a gas turbine engine 10 including a low pressure compressor 12, a high pressure compressor 14, and a combustor 16. In one embodiment, engine 10 is a GE90 engine commercially available from General Electric Company, Cincinnati, Ohio. Engine 10 also includes a high pressure turbine 18, a low pressure turbine 20, and a plurality of inspection port openings (not shown in FIG. 1). The inspection port openings, discussed in more detail below, provide access for inspection of turbines 18 and 20, compressors 12 and 14, and combustor 16. Compressor 12 and turbine 20 are coupled by a first shaft 24, and compressor 14 and turbine 18 are coupled by a second shaft 26.

Figure 2:
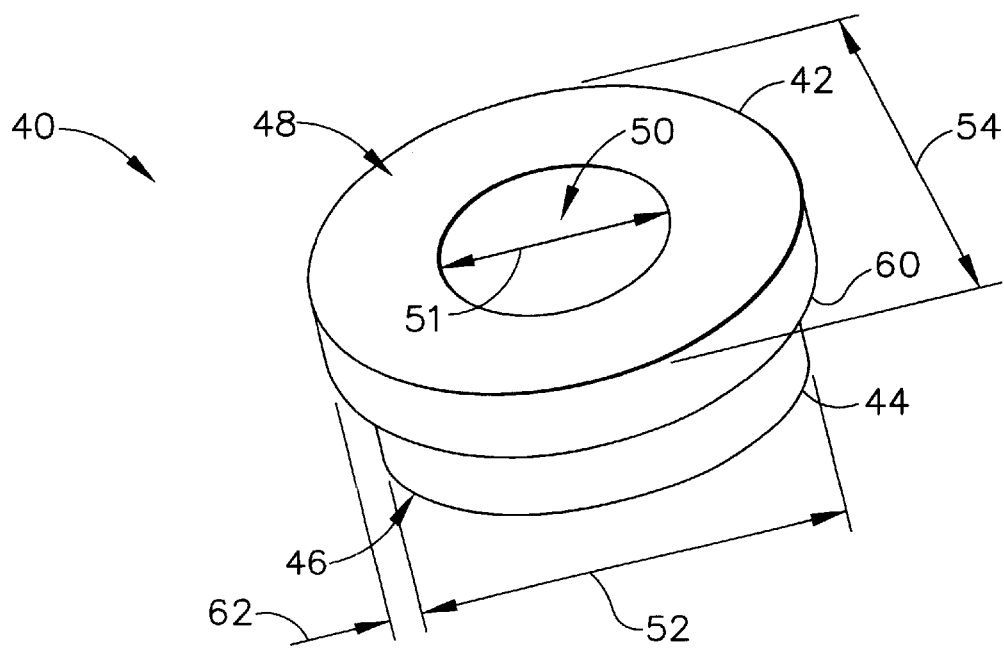
FIG. 2 is a perspective view of a retainer.

FIG. 2 is a perspective view of a retainer 40 for use with a borescope plug (not shown in FIG. 2) for a gas turbine engine, similar to gas turbine engine 10 (shown in FIG. 1). Retainer 40 includes an annular ring 42, a radial projection 44, a inner side 46, and an outer side 48. A bore 50 extends through annular ring 42 and radial projection 44, between inner and outer sides 46 and 48, respectively. Bore 50 is substantially circular and has a diameter 51.

Radial projection 44 extends radially outward and substantially perpendicularly from annular ring 42, and has an outer diameter 52. Radial projection outer diameter 52 defines a substantially circular cross-sectional profile for radial projection 44.

Annular ring 42 extends from radial projection 44 and includes an outer diameter 54 that defines a substantially circular cross-sectional profile for annular ring 44. Because annular ring outer diameter 54 is larger than radial projection outer diameter 52, an annular shoulder 60 is defined between radial projection outer diameter 52 and annular ring outer diameter 54. Annular shoulder 60 has a width 62 measured between radial projection outer diameter 52 and annular ring outer diameter 54.

Figure 3:
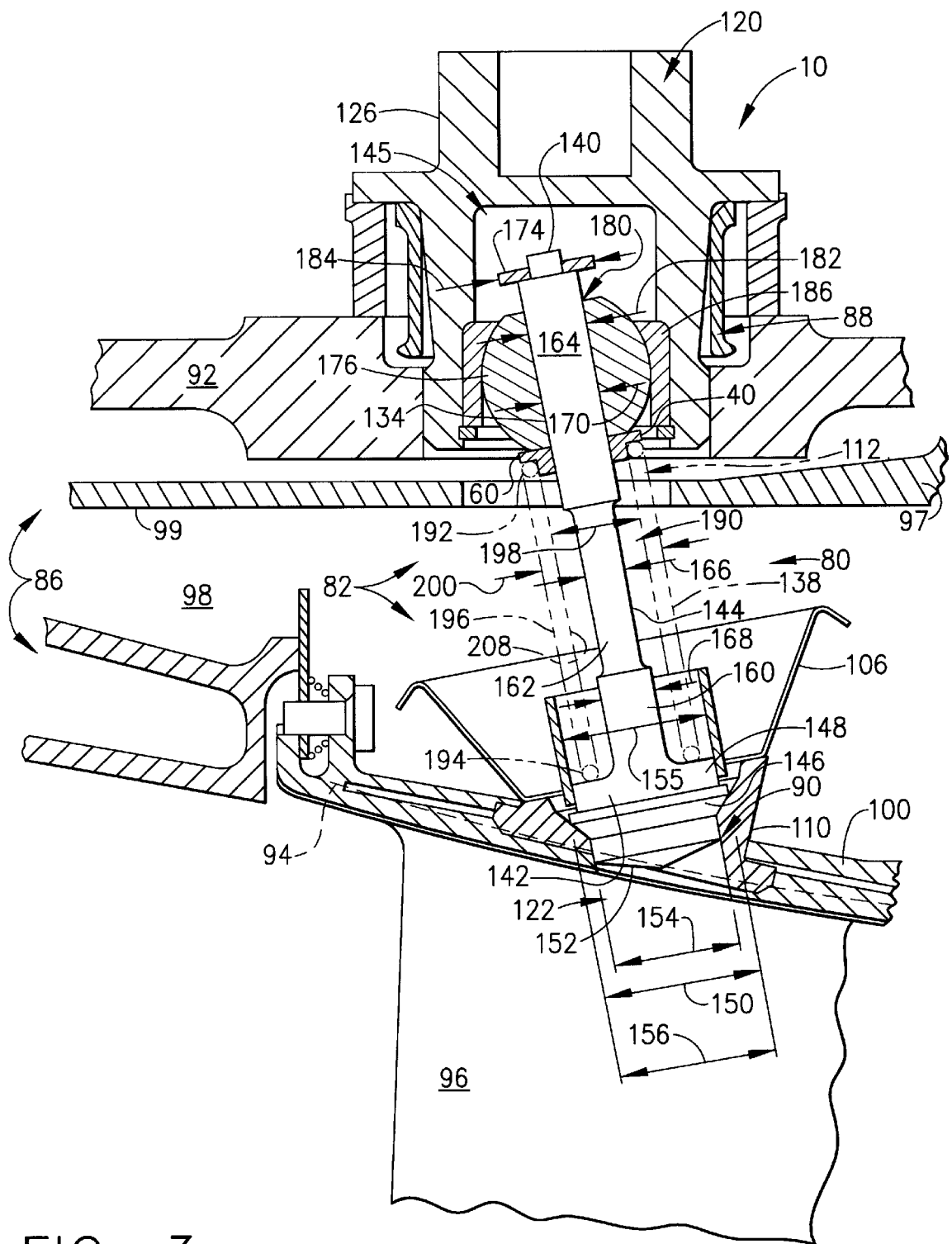
FIG. 3 is a perspective view of a borescope plug for use with the gas turbine engine shown in FIG. 1.

FIG. 3 is a perspective view of a borescope plug assembly 80 for use with gas turbine engine 10. Gas turbine engine 10 includes a plurality of borescope inspection accesses 82. Borescope inspection accesses 82 are formed within engine components such as combustor 16, and compressors 12 and 14, (shown in FIG. 1) to permit inspection and monitoring of engine 10. In the exemplary embodiment, engine 10 includes a borescope inspection access 82 formed within a double-walled structure 86. More specifically, borescope inspection access 82 includes first and second opposing port openings 88 and 90, respectively, that extend through respective first and second opposing walls 92 and 94. In the exemplary embodiment, first wall 92 is an outer combustor casing and second opposing wall 94 is a turbine casing surrounding a number one high pressure turbine nozzle 96.

Combustor outer casing 92 is generally annular and extends downstream from a combustor diffuser (not shown) to turbine nozzle 96. A combustor liner 97 is generally annular and is radially inward from combustor outer casing 92. Turbine nozzle 96 is upstream from high pressure turbine 18 (shown in FIG. 1) such that combustion gases exiting combustor 16 are routed through turbine nozzle 96 to high pressure turbine 18. Combustor outer casing 92 is radially outward from turbine casing 94 such that a duct 98 is defined between an inner surface 99 of combustor liner 97 and an outer surface 100 of turbine casing 94. In the exemplary embodiment, duct 98 is a bypass duct.

A shroud 106 extends from turbine casing outer surface 100 radially outward into duct 98. More specifically, shroud 106 is attached to a flange 110 defining inspection port opening 90 towards combustor liner inner surface 99. Shroud 106 is attached circumferentially around inspection port opening 90 and shields port opening 90 from hot gases flowing through duct 98.

Borescope plug assembly 80 extends through duct 98 to seal first and second opposing port openings 88 and 90, respectively. Borescope plug assembly 80 also extends through an opening 112 in combustor liner 97. Borescope plug assembly 80 includes a first end 120 radially inward from combustor outer casing 92 and a second end 122 adjacent turbine casing 94. Borescope plug first end 120 includes a borescope plug cap 126. Cap 126 is secured to combustor outer casing 92 and more specifically, is secured in position relative to inspection port opening 88.

Borescope plug assembly 80 also includes a plunger 134, retainer 40, and a biasing mechanism 138. Plunger 134 is known in the art and includes a first end 140, a second end 142, and a body 144 extending therebetween. Plunger first end 140 is housed within a cavity 145 defined within borescope plug cap 126.

Plunger second end 142 includes a sealing plug 146 extending from a plunger base 148. Sealing plug 146 has a diameter 150 adjacent base 148. Sealing plug 146 also has a frustoconical tip portion 152 that has a base diameter 154. Plunger base 148 has an outer diameter 155 that is approximately equal to plunger sealing plug diameter 150. Sealing plug diameter 150 is larger than a diameter 156 of inspection port opening 90, and sealing plug tip portion diameter 154 is slightly less than inspection port opening diameter 156. Accordingly, when borescope plug assembly 80 is in sealing contact with turbine casing 94, sealing plug tip portion 152 is received within inspection port opening 90 and sealing plug 146 contacts inspection port flange 110 in sealing contact adjacent plunger base 148.

Plunger body 144 includes a flange portion 160, a center portion 162, and a first end portion 164. Plunger body flange portion 160 extends between plunger second end 142 and center portion 162, and plunger body first end portion 164 extends between plunger first end 140 and plunger body center portion 162. Plunger body center portion 162 is substantially cylindrical and has an outer diameter 166 that is smaller than both an outer diameter 168 of plunger body flange portion 160 and an outer diameter 170 of plunger body first end portion 164.

Plunger body first end portion 164 includes a groove (not shown) sized to receive an annular washer 174. Washer 174 is attached to plunger body first end portion 164. In one embodiment, washer 174 is welded to plunger body first end portion 164. A self-aligning bearing 176 is adjacent inspection port opening 88 and includes a bore 180 extending therethrough. Bore 180 has a diameter 182 that is slightly larger than plunger body first end portion diameter 170, and smaller than an outer diameter 184 of washer 174. In one embodiment, bearing 176 is a ball bearing.

Bearing 176 is held in position within a pair of bearing housings 186 with washer 174. More specifically, bearing 176 is retained adjacent retainer annular ring 42, and is between washer 174 and retainer 40. Furthermore, bearing housing 186 maintains bearing 176 in sealing contact with bearing housing 186, such that airflow is prevented from flowing through inspection port opening 88 and through bearing housing 186.

Retainer bore diameter 52 is slightly larger than plunger body first end portion diameter 170. Accordingly, plunger 134 extends through retainer 40. Plunger 134 is also extended through a cavity 190 defined within biasing mechanism 138.

Biasing mechanism 138 includes a first end 192, a second end 194, and a body 196 extending therebetween. Biasing mechanism cavity 190 also extends between biasing mechanism first and second ends 192 and 194, respectively. Biasing mechanism body 196 is substantially cylindrical and has an inner diameter 198 and an outer diameter 200. Inner and outer diameters 198 and 200, respectively, are substantially constant between biasing mechanism body first and second ends 192 and 194, respectively. In one embodiment, biasing mechanism 138 is a spring.

Biasing mechanism outer diameter 200 is substantially equal to retainer annular ring outer diameter 54 (shown in FIG. 2), and biasing mechanism inner diameter 198 is slightly larger than retainer radial projection outer diameter 52 (shown in FIG. 2). Accordingly, when borescope plug assembly 80 is assembled, retainer annular shoulder 60 contacts biasing mechanism first end 192, and retainer radial projection 44 extends into biasing mechanism cavity 190. More specifically, biasing mechanism body inner diameter 198 is defined by an inner surface 208 of biasing mechanism 138.

Retainer annular shoulder 60 extends into biasing mechanism cavity 190 in close proximity to a biasing mechanism body inner surface 208, and thus, prevents biasing mechanism 138 from compressing radially inward or shifting, such that biasing mechanism 138 may contact plunger 134. Additionally, because biasing mechanism outer diameter 200 is smaller than plunger flange diameter 155, biasing mechanism second end 194 contacts plunger flange 146. Accordingly, retainer annular shoulder 60 also ensures the biasing mechanism is biased such that biasing mechanism second end 194 remains in contact with plunger flange 146 to maintain plunger sealing plug 146 in sealing contact against inspection port flange 110.

Borescope plug assembly 80 is initially assembled then attached within engine 10. Initially borescope plug plunger 134 is inserted through biasing mechanism cavity 190. More specifically, plunger first end 140 is inserted through biasing mechanism 138 such that biasing mechanism second end 194 contacts plunger second end 142. Plunger first end 140 is then inserted through retainer bore 50. More specifically, retainer 40 is inserted over plunger 134 such that radial projection 44 extends into biasing mechanism cavity 190.

Plunger first end 140 is then inserted through bearing bore 180 and washer 174 is attached to plunger first end 140. Washer 174 maintains plunger first end 140 within borescope plug cap cavity 145 and prevents plunger 134 from sliding outwardly through bearing 176. Bearing housing 186 maintains bearing 176 in sealing contact with bearing housing 186, and bearing housing 186 is then secured within borescope cap 126.

Borescope plug assembly 80 is then installed within engine 10 such that borescope plunger second end 142 is inserted through inspection port opening 88 and extended within turbine casing shroud 106 to be adjacent turbine casing inspection port opening 90. More specifically, borescope plug assembly 80 is attached to engine 10 such that plunger sealing plug tip portion 152 is received within inspection port opening 90 and plunger sealing plug 146 is in sealing contact with inspection port flange 110.

During use, hot temperatures generated as a result of engine 10 operating, cause structures, such as structure 86 to thermally expand. Often because of exposure to various temperature differences, combustor casing 92 and turbine casing 94 experience differential thermal growth. Borescope plug biasing mechanism 138 permits borescope plug assembly 80 to expand and contract in proportion to the differential thermal growth.

As borescope plug assembly 80 expands and contracts in proportion to the differential thermal growth, biasing mechanism 138 maintains plunger sealing tip portion 152 in sealing contact with inspection port opening 90, while bearing housing 186 permits bearing 176 to swivel while maintaining sealing contact with housing 186, such that airflow is prevented from flowing through inspection port opening 88. Furthermore, because biasing mechanism 138 is substantially cylindrical and has a substantially constant diameter 200, retainer 40 contacts biasing mechanism 138 to maintain its position relative to plunger 134, such that despite differential thermal growth, biasing mechanism 138 may not contact plunger 134. Additionally, during expansion and contraction of borescope plug assembly 80, washer 174 contacts bearing 176 and limits an amount of travel of plunger 134.

The above-described borescope plug is cost-effective and highly reliable. The borescope plug includes a retainer and a biasing mechanism. The biasing mechanism biases a plunger to maintain sealing contact against a first inspection port opening and the retainer maintains the biasing mechanism in position relative to the plunger. Accordingly, the retainer prevents the biasing mechanism from contacting the plunger. As a result, the retainer facilitates extending the useful life of the plunger and the borescope plug in a cost-effective and reliable manner.

While the invention has been described in terms of various specific embodiments, those skilled in the art will recognize that the invention can be practiced with modification within the spirit and scope of the claims.

What is claimed is:

1. A method for centering a borescope plug assembly relative to a gas turbine engine inspection port opening, the borescope plug assembly including a plunger, a retainer, and a biasing mechanism, said method comprising the steps of:

inserting the borescope plunger through the borescope plug biasing mechanism, and installing the borescope retainer to the borescope plunger such that the retainer circumscribes the plunger and is in contact with an end of the biasing mechanism, and such that the biasing mechanism circumscribes a portion of the retainer.

2. A method in accordance with claim 1 wherein said step of inserting the borescope plunger through the borescope plug biasing mechanism further comprises the step of using the biasing mechanism to maintain a position of the borescope plunger relative to the gas turbine engine.

3. A method in accordance with claim 2 wherein said step of installing the borescope retainer further comprises the step of attaching the borescope plug retainer to the borescope plunger to maintain a position of the biasing mechanism relative to the borescope plunger.

4. A method in accordance with claim 3 wherein the borescope plug biasing mechanism includes a first side, a second side, and a substantially cylindrical body extending therebetween, the biasing mechanism body having an inner diameter and an outer diameter, the body outer diameter substantially constant between the biasing mechanism first and second sides, the borescope plug retainer having an annular shoulder and an annular projection, the annular projection having an outer diameter smaller than the biasing mechanism body inner diameter, said step of installing the borescope retainer further comprising the step of engaging the biasing mechanism with the retainer such that the retainer annular projection is inserted within a cavity extending through the biasing mechanism body.

5. A method in accordance with claim 4 wherein the biasing mechanism is a spring, said step of inserting the borescope plunger through the borescope plug biasing mechanism further comprising the step of inserting the plunger through the spring.

6. Apparatus for a gas turbine engine including at least one inspection port opening sized to receive a borescope, said apparatus comprising:

a plunger comprising a shaft portion;

a biasing mechanism configured to maintain a position of the borescope relative to the gas turbine engine inspection port opening; and a retainer engaging said biasing mechanism and configured to maintain a position of said biasing mechanism relative to said plunger, said retainer circumscribing said plunger shaft portion, said plunger extending through said biasing mechanism, said biasing mechanism circumscribing a portion of said retainer.

7. Apparatus in accordance with claim 6 wherein said biasing mechanism comprises a first end, a second end, and a body extending therebetween, said body substantially cylindrical.

8. Apparatus in accordance with claim 7 wherein said biasing mechanism body defines an outer diameter, said outer diameter substantially constant between said body first end and said body second end.

9. Apparatus in accordance with claim 6 wherein said retainer comprises an annular shoulder, said annular shoulder engaging said biasing mechanism.

10. Apparatus in accordance with claim 9 wherein said retainer annular shoulder defined by an annular projection, said retainer annular projection has an outer diameter smaller than an inner diameter defined by said biasing mechanism body.

11. Apparatus in accordance with claim 6 wherein said biasing mechanism is a spring.

12. Apparatus in accordance with claim 6 wherein said biasing mechanism body defines a cavity, said plunger extending through said biasing mechanism body cavity.

13. Apparatus in accordance with claim 12 wherein said retainer comprises an annular shoulder, said annular shoulder configured to prevent said biasing mechanism body from contacting said plunger.

14. A borescope plug assembly for a gas turbine engine including at least one inspection port opening sized to receive a borescope, said borescope plug assembly comprising a plunger, a biasing mechanism, and a retainer, said retainer circumscribing said plunger and configured to engage said biasing mechanism to maintain a position of said biasing mechanism relative to the borescope, said biasing mechanism circumscribing a portion of said retainer and configured to maintain a position of said plunger relative to the gas turbine engine inspection port opening, said plunger configured to be inserted through said biasing mechanism.

15. A borescope plug assembly in accordance with claim 14 wherein said borescope plug biasing mechanism comprises a first side, a second side, and a substantially cylindrical body extending therebetween, said body having an inner diameter and an outer diameter, said body outer diameter substantially constant between said biasing mechanism first and second sides.

16. A borescope plug assembly in accordance with claim 15 wherein said retainer comprises an annular projection having an outer diameter, said annular projection outer diameter smaller than said body inner diameter.

17. A borescope plug assembly in accordance with claim 16 wherein said annular projection defines an annular shoulder, said annular shoulder engages said biasing mechanism.

18. A borescope plug assembly in accordance with claim 17 wherein said biasing mechanism comprises a cavity extending through said biasing mechanism body, said annular shoulder configured to contact said biasing mechanism body to prevent said biasing mechanism from contacting said plunger.

19. A borescope plug assembly in accordance with claim 15 wherein said biasing mechanism is a spring.

* * * * *